United States Patent [19]

Okano

[11] Patent Number: 4,698,697

[45] Date of Patent: Oct. 6, 1987

[54] METHOD AND SYSTEM FOR RECORDING VIDEO INFORMATION WITH A PHASE CONTROL OPERATION BY WHICH A PHASE VALUE OF A RECORDING RF SIGNAL OF EACH 1H PERIOD IS DESIRABLY ADJUSTED

[75] Inventor: Takashi Okano, Tokorozawa, Japan

[73] Assignee: Pioneer Video Corporation, Yamana, Japan

[21] Appl. No.: 906,626

[22] Filed: Sep. 10, 1986

Related U.S. Application Data

[63] Continuation of Ser. No. 490,126, Apr. 29, 1983, abandoned.

[30] Foreign Application Priority Data

May 1, 1982 [JP] Japan .................................. 57-074222

[51] Int. Cl.$^4$ .............................................. H04N 5/92
[52] U.S. Cl. .................................. 358/340; 360/33.1; 360/37.1; 369/32
[58] Field of Search ............... 358/319, 335, 340, 342, 358/328, 339, 322, 323, 315, 153; 360/32, 33.1, 36.1, 37.1, 39, 36.2; 369/32

[56] References Cited

U.S. PATENT DOCUMENTS

| | | | |
|---|---|---|---|
| 3,888,385 | 6/1975 | Loughry | 360/36.1 X |
| 4,203,138 | 5/1980 | Elenbaas | 360/37.1 |
| 4,456,927 | 6/1984 | Marin | 358/153 |

Primary Examiner—Aristotelis M. Psitos
Attorney, Agent, or Firm—Fleit, Jacobson, Cohn & Price

[57] ABSTRACT

In order to reduce a crosstalk component contained in a playback video signal reproduced from a recording medium such as a video disc, method and system for recording a video information comprises a step for recording a video signal in a manner that an absolute value of a difference between a cumulative value of the phase of a recording RF signal of each horizontal scanning period of a first section of recording tracks and a second cumulative value of the phase of the recording RF signal of each horizontal scanning period of a second section of said recording tracks adjacent to said section of recording tracks is controlled to a value $(2m+1)\pi$ (m being a positive integer including 0).

7 Claims, 11 Drawing Figures

METHOD AND SYSTEM FOR RECORDING VIDEO INFORMATION WITH A PHASE CONTROL OPERATION BY WHICH A PHASE VALUE OF A RECORDING RF SIGNAL OF EACH 1H PERIOD IS DESIRABLY ADJUSTED

This application is a continuation of application Ser. No. 490,126, filed Apr. 29, 1983, now abandoned.

BACKGROUND OF THE INVENTION

1. Field of the Invention

The present invention relates to method and system for recording video information and more particularly to method and system which are capable of reducing a crosstalk phenomenon which tends to appear during playing back of the recorded video information.

2. Description of Background Information

In a system for reproducing a video signal recorded on a recording medium such as a video disc, it is usually not easy to reduce a crosstalk phenomenon contained in a reproduced video signal because of a highly densed arrangement of adjacent recording tracks. The presence of such a crosstalk phenomenon has resulted in a deterioration of the quality of the reproduced picture. Therefore it is conceivable to provide a means for cancelling the crosstalk phenomenon in the side of the playback system. However, such a provision of an additional means would cause increase in the size and the price of the playback system.

SUMMARY OF THE INVENTION

An object of the present invention is therefore to provide method and system for recording video information in which a specific process is utilized for reducing the crosstalk phenomenon during recording operation, thereby eliminating the need for providing an additional means in the playback system.

According to an aspect of the present invention, a method for recording video information comprises a phase control step for adjusting an absolute value of a difference between a cumulative value of the phase of a recording RF signal of each horizontal scanning period of a first section of recording tracks and a second cumulative value of the phase of the recording RF signal of each horizontal scanning period of a second section of the recording tracks adjacent to the first section of recording tracks, to a constant value $(2m+1)\pi$ (m being a positive integer including 0).

According to another aspect of the present invention, the phase control step is to adjust a remaining phase value of recording RF signal which is obtained by subtracting a value $2k_1\pi$ ($k_1$ being a positive integer including 0) from a cumulative value of the phase of the recording RF signal of each horizontal scanning period, to a constant value $\alpha$ ($\alpha$ being an invariable including 0) for the first section of the recording track and to a second constant value $\alpha+\pi$ or $\alpha-\pi$ for a second section of recording tracks adjacent to the first section of recording tracks.

According to further aspect of the present invention, a method for recording a video information further comprises a step for controlling a luminance level of the recording video signal by means of a signal obtained by an integration of the recording video signal for each horizontal scanning period and further adjusting a remaining phase value of an FM-RF signal of the recording video signal modulated in the amplitude of the luminance level thereof to constant values $\alpha$ and $\alpha\pm\pi$.

According to still further aspect of the present invention, a system for recording video information comprises a phase control means for adjusting an absolute value of a difference between a cumulative value of the phase of a recording RF signal of each horizontal scanning period of a first section of recording tracks and a second cumulative value of the recording RF signal of each horizontal scanning period of a second section of the recording tracks adjacent to the first section of recording tracks to a value $(2m+1)\pi$ (m being a positive integer including 0).

According to further aspect of the present invention, the phase control means is constructed to adjust a remaining phase value of recording RF signal which is obtained by subtracting a value $2k\pi$ (k being a positive integer including 0) from the cumulative value of the phase of the recording RF signal of each horizontal scanning period, to a constant value $\alpha$ ($\alpha$ being an invariable including 9) for the first section of the recording track and to a second constant value $\alpha+\pi$ or $\alpha-\pi$ for a second section of recording tracks adjacent to the first section of recording tracks.

According to further aspect of the present invention, a system for recording video information further comprises a level control means for controlling a luminance level of the video signal in accordance with a signal obtained by an integraton of the video signal for each horizontal scanning period and a modulating means for modulating an output signal of the level control means to produce an FM-RF signal of the video signal, and controlling a remaining phase value of the FM-RF signal to the constant value of $\alpha$ and $\alpha\pm\pi$.

According to still further aspect of the present invention, a system for recording a video carrier frequency modulated by a video signal on a recording medium having a first section of recording tracks and a second section of recording tracks adjacent to the first section, comprises a sample and integration means for sampling the video signal at predetermined sampling times and accumulating the sampled values during each horizontal scanning period, a deriving means for deriving a remaining value from the accumulated value of the sample and intergation means and a value corresponding to an angular shift amount $2\pi$ of the carrier frequency, a recording track detection means for detecting a presence of the first and second section of recording tracks and producing a recording track section detection signal, a polarity controlling means for keeping a polarity of the remaining value upon presence of the recording track section detection signal indicative of the first section, and inverting the polarity of the remaining value upon presence of the recording track section detection signal indicative of the second section, a level shifting means for effecting a level shifting of the video signal in accordance with the polarity controlled remaining value from the polarity controlling means, an angular modulation means for effecting an angular modulation of the carrier frequency in accordance with a level shifted video signal produced by the level shifting means, and a recording means for recording the carrier frequency produced by the angular modulation means, on the recording medium, whereby controlling an absolute value of a difference between a first cumulative value of a phase of the carrier frequency for the first section of recording tracks and a second cumulative value of the phase of the carrier frequency for the second section of recording tracks, to a constant value of an odd multiple of $\pi$.

According to still further aspect of the present invention, a medium recorded with recording video information. The video information is recorded on the medium such that an absolute value of a difference between a first cumulative value of the phase of a recording RF signal of each horizontal scanning period of a first section of recording tracks and a second cumulative value of the phase of the recording RF signal of each horizontal scanning period of a second section adjacent to the first section of recording tracks is maintained to a value $(2m+1)\pi$ (m being a positive integer including 0).

The scope of the present invention and applicability of the present invention will become apparent from the detailed description given hereinafter. However, it is understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The foregoing and other objects and advantages of the invention will be more clearly understood from the following description taken in conjunction with the accompanying drawings which are given by way of illustration only, and thus do not limit the present invention, and wherein.

DETAILED DESCRIPTION OF PREFERRED EMBODIMENTS

A principle of the present invention will be explained first.

On a recording medium such as a recording disc, a recording RF signal, which is generally an FM signal, is recorded along a recording track having a spiral or concentrical shape. The phase of this RF signal can be treated by considering a section of a recording track which corresponds to each horizontal scanning period (1H) of the video signal. If a start time and an end time of each section of the recording track are expressed as $t=0$ and $t=T_H$ respectively, a phase $\theta_n(t)$ of the RF signal on sections of the recording tracks can be expressed as follows:

$$\theta_n(t) = \int_0^t \Omega_n(t)dt + \theta_n(0) \qquad (1)$$

in which $\Omega_n(t)$ is an angular frequency of the RF signal of the nth section of the recording track at a time t, and $\theta_n(0)$ is an initial value of the phase of the RF signal for the nth section of the recording track being considered at a time $t=0$.

Figure 1:
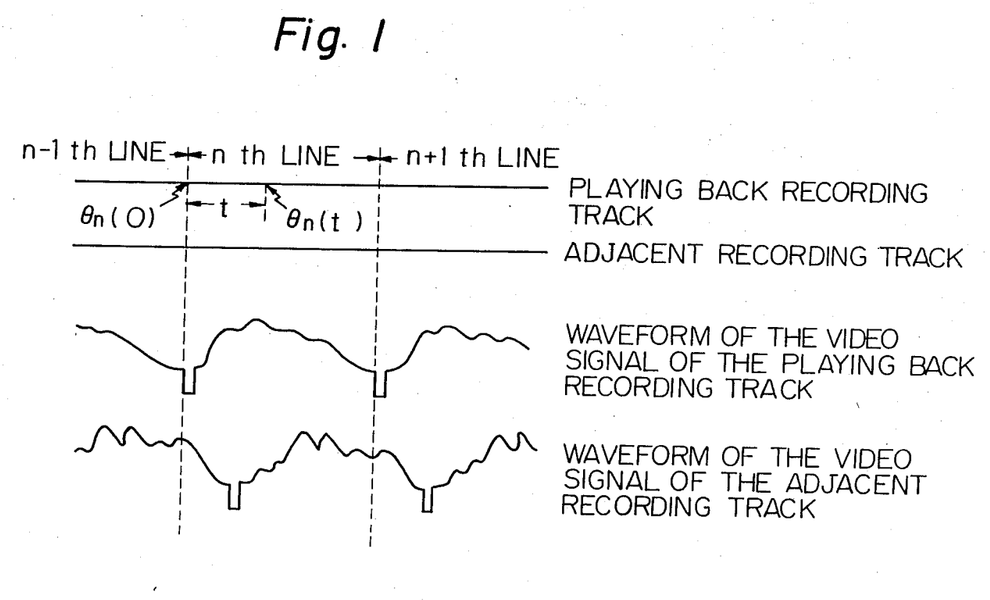
FIG. 1 is a waveform diagram showing a relationship between recording video signals to be recorded in a recording track of a recording disc and another recording track adjacent thereto.

The boundaries of each of this 1H section having a period of one horizontal scanning need not necessarily correspond to the positions of the horizontal synchronizing signal contained in the video signal to be recorded. In other words, the position of the boundaries can be defined arbitrary at any point of the recording track. However, in the present specification, the position of each boundary is selected at the position of each horizontal synchronizing signal for the purpose of explanation and the better understanding of the present invention. FIG. 1 shows waveforms in the case of a constant linear velocity (CLV) disc and the position corresponding to the boundary of each 1H section in a recording track adjacent to a recording track now being observed which is the cause of the crosstalk disturbance and which is not aligned to the position of the horizontal synchronizing signal of the recording track now being observed. In addition, it is obvious that these positions are aligned with each other in the case of constant angular velocity (CAV) disc because the period of one revolution of the disc is selected to be a multiple of the period between each horizontal synchronizing signal.

Figure 2:
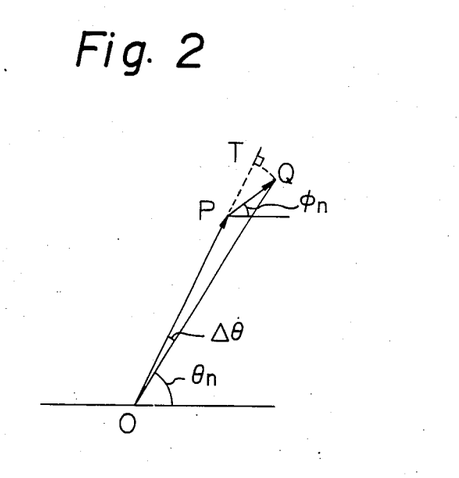
FIG. 2 is a vector diagram showing a relationship between a playback RF signal and a RF crosstalk component accompanied thereto.

Therefore the playback RF signal which is shown by the equation (1) is subjected to the phase modulation due to the crosstalk component which arises from a recording track adjacent to the recording track being played back. In FIG. 2, the line OP indicates the vector of the RF signal component of the recording track of which the recorded video signal is being played back. The line PQ indicates the RF crosstalk component arising from the adjacent recording track. Accordingly, the line OQ indicates the vector of the playback RF signal which includes the crosstalk component. In addition, the $\phi_n$ represents the phase of the RF crosstalk component.

According to the relation shown in FIG. 2, the following equation (2) can be derived for the $\Delta\theta$ which indicates the amount of the shift of the phase $\theta_n$ of the playback RF signal which is subjected to the phase modulation due to the RF crosstalk component.

$$\tan\Delta\theta = TQ/OT \qquad (2)$$
$$= \epsilon \sin(\theta_n - \phi_n)/\{1 + \epsilon \cos(\theta_n - \phi_n)\}$$

In the equation (2), the amplitude (absolute value) of the vector OP is determined to "1", and the amplitude (absolute value) of the vector PQ is indicated by "$\epsilon$". Since the magnitude of $\epsilon$ is extremely small and usually less than $-30$ db, the equation (2) can be rewritten as follows.

$$\Delta\theta \approx \epsilon \sin(\theta_n - \phi_n) \quad (3)$$

If we assume that the RF signal is an FM signal modulated in frequency by means of the video signal, the equation (3) indicates the amount of the phase shift of the FM signal which is caused by the RF crosstalk component. Therefore, magnitude of a crosstalk component which would appear in an FM demodulator output signal can be obtained by differentiating the equation (3) with respect to time t. The thus reproduced beat component due to the crosstalk effect which will appear in the video screen as a disturbance is expressed by the follwing equation.

$$\frac{d(\Delta\theta)}{dt} = \epsilon \left( \frac{d\theta_n}{dt} - \frac{d\phi_n}{dt} \right) \cos(\theta_n - \phi_n) \quad (4)$$

In other words, the amplitude of the demodulated video crosstalk signal is proportional to the product between the amplitude of the RF crosstalk component which is being mixed to the playback signal and the difference between an instantaneous frequency $d\theta_n/dt$ of the playback RF signal and an instantaneous frequency $d\phi_n/dt$ of the RF crosstalk component. Further, it is understood that the phase of the demodulated video crosstalk signal is determined in accordance with the difference between the phase $\theta_n$ of the playback RF signal and the phase $\phi_n$ of the RF crosstalk component.

In order to drive the striped beat pattern due to the crosstalk component out of the visible part of the screen of the picture tube, it is necessary that the following condition is satisfied. Namely, the instantaneous frequencies of the beat components which are being produced in adjacent two scanning lines (referred to as "lines" hereinafter) are equal to each other, and the initial phase of these beat components are in the inversed relation between adjacent two lines.

Figure 3:
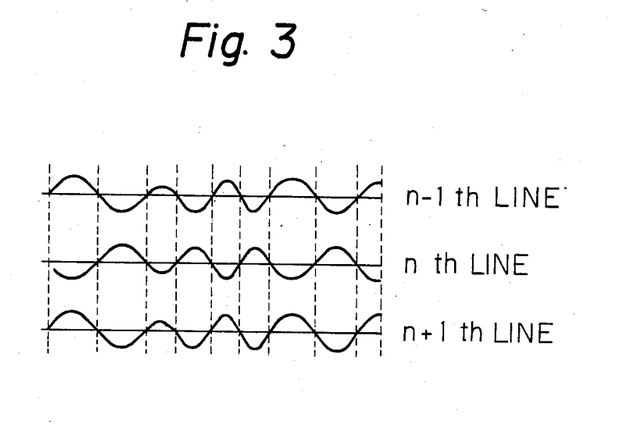
FIG. 3 is a waveform diagram showing waveforms of reproduced beat components of contiguous lines, especially in the case of an interleave state.

Wave forms of the beat components which satisfy the above condition is illustrated in FIG. 3. As it will be understood from FIG. 3, the beat components will be cancelled on the whole due to the interaction between the beat components of the adjacent lines.

Now, the frequency and the phase of the beat component will be discussed in the case of the CLV recording disc whose recording signal form is illustrated in FIG. 1, with reference to the equation (4). The instantaneous frequency of the beat component is obtained by differentiating the phase term of the equation (4) and expressed as follows.

$$\frac{d\theta_n}{dt} - \frac{d\phi_n}{dt} = \Omega_n - \omega_n \quad (5)$$

in which the $\omega_n$ is the instantaneous frequency of the RF crosstalk component which arises from an adjacent recording track.

In this way, the instantaneous frequency of the beat component of the n+1th line which is the next to the nth line is expressed as follows.

$$\frac{d\theta_{n+1}}{dt} - \frac{d\phi_{n+1}}{dt} = \Omega_{n+1} - \omega_{n+1} \quad (6)$$

Furthermore, due to a line similarity (a characteristic wherein similar pieces of the video information are recorded in successive lines) of the recorded video signal, the following relation will be obtained.

$$\left. \begin{array}{l} \Omega_n(t) \approx \Omega_{n+1}(t) \\ \omega_n(t) \approx \omega_{n+1}(t) \end{array} \right\} \quad (7)$$

Therefore, the instantaneous frequencies of the nth line and the same of the n+1th line which are expressed by the equations (5) and (6) will be almost equal to each other.

The initial phase of the beat component will be discussed next. The initial phase can be calculated by replacing the phase term in the equation (4) by a value t=0, and the value will be $\theta_{n+1}(0) - \phi_{n+1}(0)$ for the n+1 th line. Furthermore, according to the equation (1), the following equation can be obtained.

$$\theta_{n+1}(0) = \int_0^{TH} \Omega_n(t)dt + \theta_n(0) \quad (8)$$

Therefore, the initial phase of the beat component of the n+1th line will be expressed as follows.

$$\theta_{n+1}(0) - \phi_{n+1}(0) = \left\{ \int_0^{TH} \Omega_n(t)dt + \theta_n(0) \right\} - \quad (9)$$

$$\left\{ \int_0^{TH} \omega_n(t)dt + \phi_n(0) \right\}$$

$$= \{\theta_n(0) - \phi_n(0)\} + \left\{ \int_0^{TH} \Omega_n(t)dt - \int_0^{TH} \omega_n(t)dt \right\}$$

In the equation (9), the term $\theta_{n+1}(0) - \phi_{n+1}(0)$ indicates the initial phase of the n+1th line, and the term $\theta_n(0) - \phi_n(0)$ indicates the initial phase of the nth line which will be referred to as A and B hereafter. Accordingly, the difference between the initial phases of the n+1th line and the nth line, A−B, will be expressed as follows.

$$A - B = \int_0^{TH} \Omega_n(t)dt - \int_0^{TH} \omega_n(t)dt \quad (10)$$

The term $$\int_0^{TH} \Omega_n(t)dt$$

indicates the cumulative value of the phase of the recording RF signal of the 1H period of the nth line. In the case of the video signal, although this value of integration does not change abruptly as the line goes, this integration value does gradually change line by line along the vertical movement of the scanning of the playback picture. Therefore, there are no interrelations between the value of $\Omega_n(t)$ and $\omega_n(t)$, and the difference $A-B$ of the initial phases of the beat components of two lines which is expressed by the equation (10) can not be constant (be changed depending on the contents of the picture information).

This means that this state does not satisfy one of the conditions for reducing the effect of the beat component, i.e., the value $|A-B|$ is equal to $(2m+1)$, (m being a positive integer including 0).

As for the cumulative value of the phase during the period of 1H, which has been expressed by $$\int_0^{TH} \Omega_n(t)dt,$$

it can be expressed as follows since the value of the phase is a function having a period of $2\pi$.

$$\int_0^{TH} \Omega_n(t)dt = 2K_1\pi + \phi_n \quad (11)$$

in which $k_1$ is a positive integer including 0, and $\phi_n$ indicates a remaining phase value which is obtained by subtracting the value $2k_1\pi$ from the cumulative value of the phase ($\phi_n$ satisfying an equation $0 \leq \phi_n < 2\pi$). Similarly, the cumulative value of the phase for the RF crosstalk component can be expressed as follows.

$$\int_0^{TH} \omega_n(t)dt = 2K_2\pi + \phi_n' \quad (12)$$

in which $k_2$ is a positive integer including 0, and $\phi_n'$ indicates a remaining phase value satisfying an equation $$0 \leq \phi_n' < 2\pi$$

Therefore, phase difference $A-B$ of the beat component between adjacent two lines will be expressed as follows.

$$A - B = \int_0^{TH} \Omega_n(t)dt - \int_0^{TH} \omega_n(t)dt \quad (13)$$
$$= 2m\pi + (\phi_n - \phi_n')$$

in which m is the value $k_1-k_2$ (being a positive or negative integer including 0). If it is possible to control the absolute value of this phase difference $\phi_n - \phi_n'$ to be always equal to the value $\pi$, then the equation $|A-B|=(2m+1)\pi$ will be satisfied (the adverse affect of the beat component to the picture being displayed can be eliminated).

As an example, a phase control can be executed in a manner that the remaining phase $\phi_n$ is set to a constant value $\alpha$ ($\alpha$ being an invariable including 0) for each horizontal scanning periods 1Hs of one revolution of the disc, then alternatively set to another constant value $\alpha+\pi$ or $\alpha+\pi$ for next horizontal scanning periods of a successive one revolution of the disc, and that the recording of video information is executed by repeating the above described phase control.

A method for controlling the cumulative value $\phi_n$ of the phase of the recording RF signal during each single horizontal scanning period 1H will be explained next.

As mentioned before, if a video signal is recorded on a recording medium such as a video disc, the video signal is usually treated by an FM modulation process. More specifically, during the FM modulation, the Sync Tip level or the Blanking level is clamped to a predetermined frequency $f_o$, and then the frequency is shifted from the frequency $f_o$ by the amount $\Delta f$ in accordance with the luminance level of the video signal.

As an example, a case in which the FM modulation is effected by fixing the Blanking level to a predetermined constant frequency will be explained next.

An angular frequency of an output signal of a modulator is expressed as follows.

$$\Omega_n(t) = cv_n(t) + \Omega_o \quad (14)$$

in which the value c indicates a modulation sensitivity (Hz/v), the value $v_n(t)$ indicates a luminance level (v) referenced upon the Blanking level, and $\Omega_o$ is an angular frequency of the Blanking level, having the value $2\pi f_o$.

Therefore, the cumulative value of the phase of the RF signal of one horizontal scanning period 1H is expressed as follows.

$$\int_0^{TH} \Omega_n(t)dt = c \int_0^{TH} v_n(t)dt + \Omega_o TH \quad (15)$$

Since c and $\Omega_o TH$ are known constant values, the cumulative phase can be obtained by the calculation of the value $$\int_0^{TH} v_n(t)dt.$$

The cumulative phase of the recording RF signal is then controlled to the values $\alpha$ and $\alpha + \pi$ in accordance with the remaining phase $\phi_n$ which can be obtained by subtracting the value $2k_1\pi$ from the cumulative phase calculated as above.

Since the value of the remaining phase is obtained by an integration only after the completion of the period of 1H, the controlling (correction) of the phase of the recording RF signal is effected after a delay of 1H.

Two methods are conceivable for this correction operation. In a first method, the angular frequency of the Sync Tip level or the Pedestal level $\Omega_o = 2\pi f_o$ is shifted by an amount $\Delta\Omega_o$, whereby setting the cumulative value of the phase which is expressed by the equation (15) to the value $\alpha$ or $\alpha \pm \pi$. In a second method, the set up level of a section of the video signal excluding the section of the Blanking signal is shifted by the amount $\Delta v$ whereby setting the cumulative value of the phase to the value $\alpha$ or $\alpha \pm \pi$.

It is needless to say that the same process of the phase correction is also to the adjacent recording tracks.

As it will be understood from the foregoing, the method according to the present invention is characterized in that the recording of the video information is performed in a manner that an absolute value $|A-B|$ of the difference between the cumulative value of the phase of the recording RF signal of each horizontal scanning periods of a first section of recording tracks $(2k_2\pi + \phi_n')$ and the cumulative value of the phase of the recording RF signal of each horizontal scanning periods of an adjacent section of the recording tracks, is controlled to $(2m+1)\pi$.

More concretely, the recording of the video information is effected by fixing the value of the remaining phase $\phi_n$ (which is obtained by subtracting a value $2k_1\pi$, $2k_2\pi$ and so on corresponding to each section of the recording tracks, from the cumulative value of the phase of the recording RF signal) to a predetermined value $\alpha$ in a first section of the recording tracks and to the values $\alpha \pm \pi$ in a second section of the recording tracks adjacent to the first section.

An embodiment of the system for recording video information according to the present invention will be explained with reference to FIG. 4 hereinafter.

Figure 4:
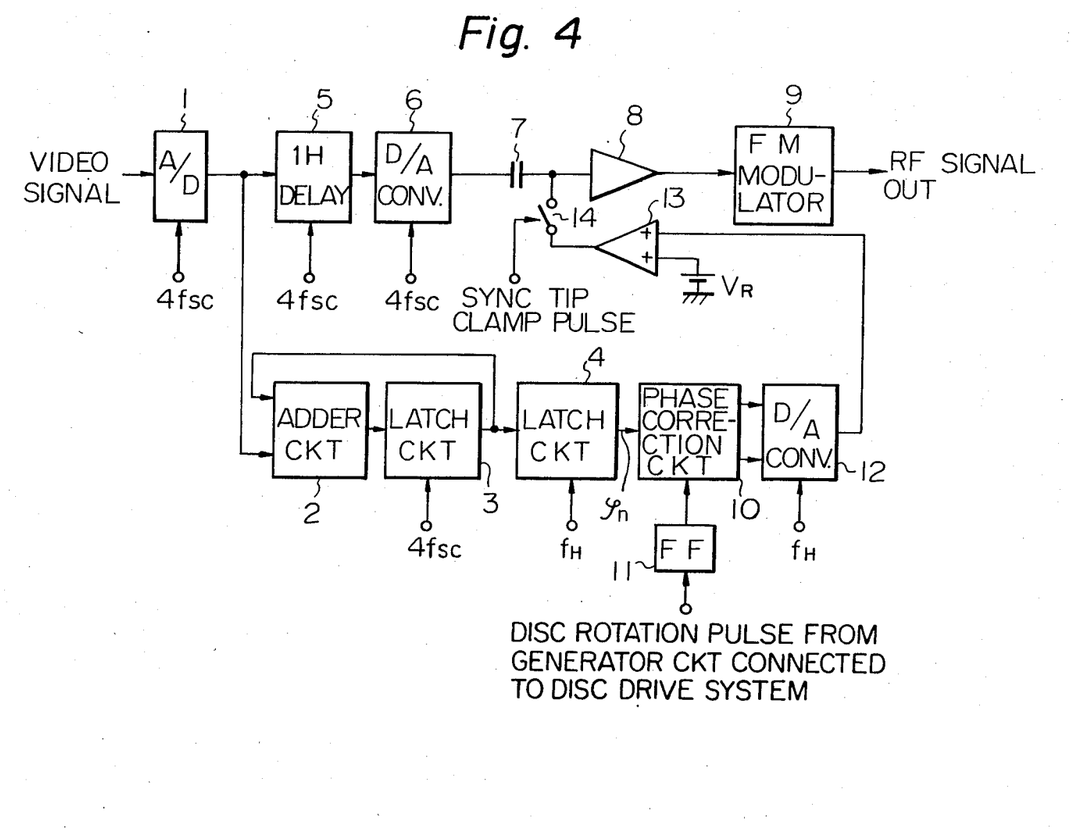
FIG. 4 is a block diagram of a first embodiment of the video signal recording system according to the present invention.

In FIG. 4, a video signal which is to be recorded on a recording disc is applied to an A/D (analog to digital) converter 1. A sampling frequency of this A/D converter 1 is selected, for example, to 4fsc (fsc being the frequency of the color subcarrier signal), and each sampled values are converted to 8 bit parallel data. If the output signal of this A/D converter is accumulated during a period of 1H (corresponding to 910 samples), then the accumulated value will be a value corresponding to $$\int_0^{TH} v_n(t)dt,$$

which is proportional to the cumulative value of the phase $2k_1\pi + \phi_n$ of the recording RF signal during a period of 1H. Therefore, an 8 bit parallel adder 2 and a latch circuit 3 are provided for the integration for obtaining the value $$\int_0^{TH} v_n(t)dt.$$

An output signal of the A/D converter 1 is applied to the 8 bit adder 2 and an output signal of the 8 bit adder 2 is then applied to the latch circuit 3 which memorizes the output signal of the 8 bit adder 2. An output signal of the latch circuit 3 is also applied to the 8 bit adder 2. The latch timing frequency of the latch circuit 3 is selected to be 4fsc so as to be synchronized with the sampling timing of the A/D converter 1.

If the circuit is arranged that a state in which all of the bits of the latch circuit 3 are logical "1" corresponds to the phase of $2\pi$, then the latch circuit 3 is reset to "0" every time the phase is equal to $2\pi$.

The output signal of the latch circuit 3 is then applied to a latch circuit 4 of the next stage, in which the input signal is latched with a timing frequency of fH (the frequency of horizontal synchronizing signal). By this arrangement, the signal value in the latch circuit 4 represents the remaining phase $\phi_n$ which is obtained by subtracting the value $2k_1\pi$ from the value $$\int_0^{TH} \Omega_n(t)dt$$

which is expressed by the equation (15).

The system is constructed in a manner that the Sync Tip level of the video signal is controlled in accordance with this signal value of the latch circuit 4 described above.

The video signal to be applied to the A/D eonverter is, in this case, previously treated by a clamping process so that an LSB (Least Significant Bit) of the output signal of the A/D converter 1 will be the Sync Tip level. The output signal of the A/D converter 1 is also applied to an D/A converter 6 via a delaying circuit 5. An output signal of the D/A converter 6 is then applied to a buffer circuit 8 through a coupling condensor 7, and an output signal of the buffer circuit is applied to an FM modulator 9.

An output signal of the latch circuit 4 which has been described above is then controlled in phase in a phase correction circuit 10 in accordance with the output state of a togle flip-flop circuit (T-FF) 11. The T-FF 11 is set reset controlled by a series of pulse signals each of which is produced every one revolution of the recording disc by means of a generator circuit connected to the disc drive system for example. As a result, the logic level of the T-FF 11 is controlled high and low alternatively as the disc rotates. The phase correction circuit 10 has a first output signal indicative of the absolute value of the compensated signal and a second output signal indicative of the polarity of the compensated signal. These output signals are then applied to a D/A converter 12 which convert the digital signal from the compensator 10 to an analog signal. This analog output signal of the D/A converter 12 is then added to a reference signal $V_R$ in an adder circuit 13 and an output signal of the adder circuit 13 is utilized to control the Sync Tip Clamping of the input signal of the buffer 8 via a Sync Tip switch 14.

If the input signal is not present, the output signals of the A/D converter 1 and D/A converter 6 are equal to 0 (zero) and consequently the level of the input signal of the FM modulator 9 becomes equal to the Sync Tip level. Therefore, the frequency of an FM-RF signal produced by the FM modulator 9 becomes equal to the Sync Tip frequency fsy. If this Sync Tip frequency is selected to a k times multiple of the frequency FH (k being an integer), then, the FM modulation signal will be expressed by the following equation (16).

$$\int_0^{TH} f_{sy}dt = f_{sy} \cdot TH = 2k\pi \tag{16}$$

Thus, the FM modulation signal can be controlled to a multiple of $2\pi$.

Then when a video signal is applied to the A/D converter 1, the D/A converter 6 produces an output signal which is delayed by 1H. On the other hand, the latch circuit 4 produces a binary digital signal N which corresponds to the remaining phase $\phi_n$.

This output signal N will be utilized in a control process (which will be described later) of the luminance level of the video signal by controlling the Sync Tip clamp level so as to control the remaining value of the cumulative phase of the FM-RF signal of the period of 1H to be 0 or $\pi$ ($\alpha$ being equal to 0).

The above mentioned correction operation will be described hereinafter.

If we assume that a binary digital signal corresponding to a value $2k\pi$ is designated by $N_o$, there is a relationship between N and $N_o$ that $N < N_o/2$ when an MSB (Most Sgnificant Bit) of the output signal N of the latch circuit 4 is equal to "0", and $N \geq N_o/2$ when the MSB is equal to "1". Therefore, by discriminating the state of the MSB, it is possible to determine whether or not the value of the phase $\phi_n$ which corresponds to N exceeds $\pi$.

The phase correction operation is classified as a first type and as a second type depending on whether or not the value $\phi_n$ exceeds $\pi$. When the MSB of the output N is "1", and a target value of the phase correction is $\pi$, then the magnitude of a signal applied for the purpose of the correction will be $-(\phi_n-\pi)$ because $\phi_n-(\phi_n-\pi)$ makes $\pi$. The magnitude of this signal can be digitally expressed as $-(N-No/2)$, since $\phi_n$ and $\pi$ correspond to N and No/2 respectively. Therefore, a calculation is performed in the phase correction circuit 10 and it produces the output signal of the absolute value of $|N-No/2|$ and the output signal indicative of the negative polarity. To the contrary, when the MSB of the output signal N is "0" and the target value of the phase correction is $\pi$, then the signal applied for the purpose of the phase correction would be $\pi-\phi_n$ i.e., $+(No/2-N)$ since $\phi_n+(\pi-\phi_n)$ makes $\pi$. The other output signals of the phase correction circuit 10 are produced by similar operational process and those are listed in the following table.

| MSB of the output N | Target of phase correction | |
|---|---|---|
| | 0 | $\pi$ |
| 0 | $-N$ | $+\left(\dfrac{No}{2} - N\right)$ |
| 1 | $+(No - N)$ | $-\left(N - \dfrac{No}{2}\right)$ |

The above explained operation of the phase correction circuit is controlled by the high-low alternating output signal of the T-FF 11 which is triggered by pulse signals, each of which are produced per one rotation of the disc.

When, for example, it is preferable that the target value of the phase control is set to the constant value 0 (zero), the output signal of the T-FF has a low level. When the output signal of the T-FF has a high level, then the value of the phase control is set to the constant value $\pi$. Then, the output signal of the phase correction circuit 10 is converted from a digital value to an analog value so that it can be used for changing the Sync Tip level.

Further, it is preferable to utilize an integration circuit which performs the function of the phase correction circuit 10 and the function of the digital to analog converter 12 for the purpose of simplifying the circuit construction. The integrated circuit is available from the TRW corporation under the trade name of TDC1007J. This integrated circuit has an input terminal for receiving a digital input signal and a terminal for receiving a signal for determining the mode of operation and an output terminal for providing an analog signal produced by digital to analog conversion process. More specifically, the integrated circuit has four modes of operation for treating the digital input signal and is further provided with a digital to analog conversion function, which will be described with reference to FIG. 7 and FIGS. 8A to 8D.

Figure 7:
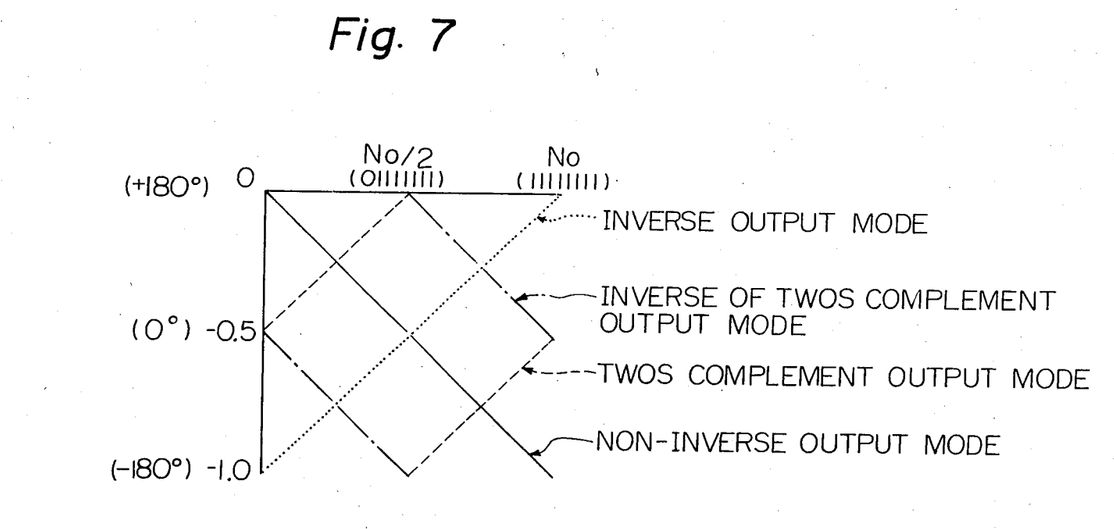
FIG. 7 is a diagram showing the input to output relationship of output signals from an integrated circuit which can be used as the phase correction circuit 10 and the digital to analog converter 12 of the embodiment of FIG. 4.
Figure 8A:
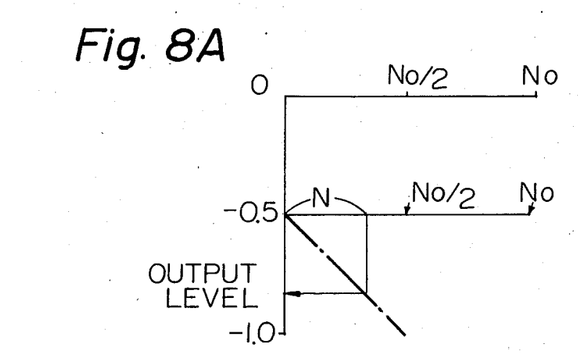
FIGS. 8A to 8D are diagrams similar to FIG. 7, showing the operation of the integrated circuit in the conditions of various combinations of the remaining phase value and the target of the phase correction.
Figure 8B:
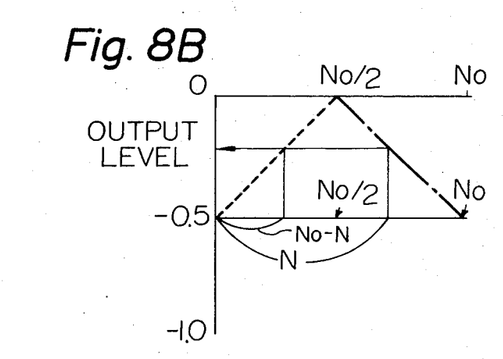
Figure 8C:
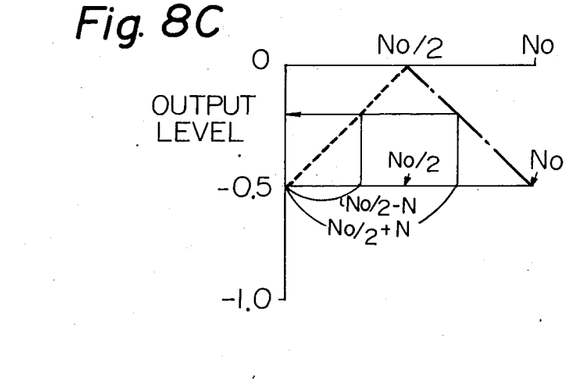
Figure 8D:
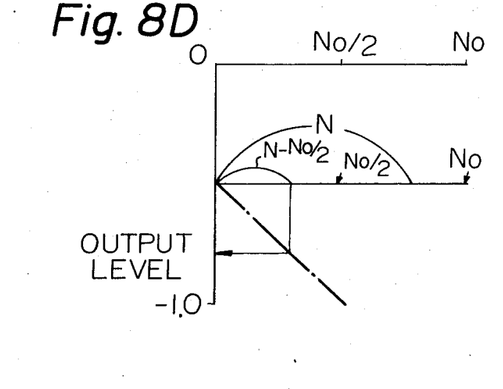

Reference is first made to FIG. 7 which shows the four modes of operation of the integrated circuit, and in which the abscissa axis indicates the magnitude of the digital input signal and the ordinate axis indicates the magnitude of analog output signal. In addition, the gain of the circuit is so determined that the amplitude of 1 V (volt) of the analog output voltage corresponds to the 360°0 phase shift amount of the modulated RF signal. Further, the circuit is so arranged that the analog output voltage of $-0.5$ V corresponds to the phase of 0° of the modulated RF signal.

The first mode of operation which is referred to as a non-inverse output mode, is depicted by the solid line in FIG. 7 and in which an analog voltage level is produced directly in proportion to the digital input signal. The second mode of operation which is referred to as an inverse output mode, is depicted by the dotted line and in which the analog output singal is produced in proportion to an inverse of the digital input signal. The third mode of operation which is referred to as a twos complement output mode, is depicted by the dashed lines in which the analog output signal is produced in proportion to a twos complement (a true complement with a base of two) of the digital input signal. Lastly, the fourth mode of operation which is referred to as an inverse of twos complement output mode, is depicted by the partly dashed lines and in which the analog output signal is produced in proportion to the inverse of twos complement of the digital input signal. As mentioned above, one of these four operational modes is selected in accordance with the mode selection signal which would be applied to the terminal for the mode selection signal. However, in adopting this integrated circuit in the system shown in FIG. 4, it is sufficient to utilize only the fourth mode of operation (the inverse of twos complement output mode) due to the reason which is explained hereinafter with reference to FIGS. 8A to 8D.

The operation of the integrated circuit in the system for recording video information will be explained by taking consideration of each of the cases shown in the aforementioned table. When the target value of the phase correction is 0 (zero) and the MSB of the input signal N is 0 (zero), this condition means that N is less than No/2 and the sign of the output analog signal should be negative, then the output analog signal can be directly obtained in accordance with the fourth mode of operation of the integrated circuit which is shown by the partly dashed line in FIG. 8A. When the target value of the phase correction is 0 (zero) and the MSB of the input signal N is 1, then the output analog value will be obtained according to the dashed line in FIG. 8B, by applying a value No$-$N. However, this analog value can also be obtained according to the partly dashed line in FIG. 8B when a value N is applied thereto. Also, when the target value of the phase correction is $\pi$ and the MSB of the input analog signal is 0 (zero), the analog output signal can be obtained in accordance with the partly dashed line by applying the value No/2$+$N in FIG. 8C instead of using the dashed line and by applying the value No/2$-$N. The value No/2$+$N is obtained by changing the MSB of the signal N from 0 (zero) to 1. Finally, when the target value of the phase correction is $\pi$ and the MSB of the input digital signal N is 1, then the output analog signal will be obtained in accordance with the partly dashed line of FIG. 8D and by applying the value N$-$No/2 which will be obtained by changing the MSB of the signal N from 1 to 0 (zero). In short, the integrated circuit can always be operated in the inverse of twos complement output mode which has been depicted by the partly dashed lines in FIG. 7 and in FIG. 8A through FIG. 8D. Further, the input digital signal can be applied without any change when the target value of the phase correction is 0 (zero) and it is sufficient to invert the MSB of the input digital signal N when the target value of the phase correction is $\pi$.

It will be appreciated from the foregoing, that the recording of the video information is effected in a manner that the remaining phase value $\phi_n$ of the recording RF signal is in turn corrected to 0 and $\pi$ for each revolution of the recording disc, that is, for each single circumferential piece of the recording track. Accordingly, the crosstalk component of the playback signals of adjacent two lines have the same frequency and inverted in phase with each other. The beat components of each line are thus cancelled, and which is seen in the waveforms shown in FIG. 3. This means that the beat component is in the interleave relation with respect to the recorded video signal. Accordingly, the beat component contained in the playback video signal can be further reduced by using a so-called comb filter in the playback system.

In addition, there is a characteristic in this circuit arrangement that the playback signal of the thus recorded video signal has a varying luminance level. However, this type of the change in the luminance level does not cause any problem because it is very common to use the Sync Tip Clamp operation in the playback system.

Furthermore, it is conceivable to control the Set Up level of the picture instead of controlling the Sync Tip level of the video signal which was described in the case of the above embodiment.

Figure 5:
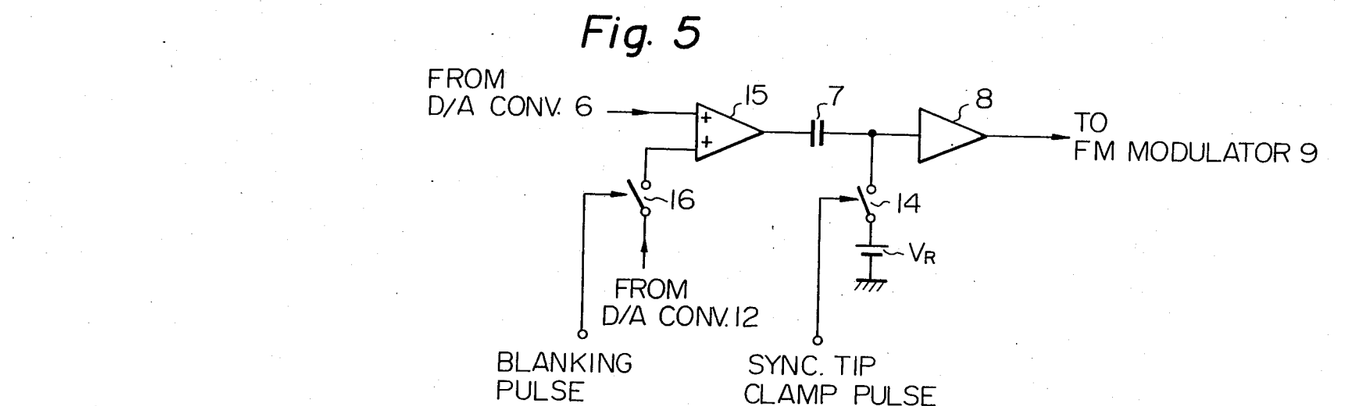
FIG. 5 is a circuit diagram of a portion of a second embodiment of the video signal recording system according to the present invention.

Reference is now made to FIG. 5 which shows a second embodiment of the video signal recording system of the present invention utilizing the above mentioned control method. In FIG. 5, like reference numerals denote like or corresponding parts of the system shown in FIG. 4.

This embodiment features that the clamp voltage level for the Sync Tip Clamping at the input terminal of the buffer circuit 8 is fixed to a constant level. An adder circuit 15 is provided for summing the output signal of the D/A converters 6 and 12, and an output signal thereof is then applied to the buffer circuit 8. The outpus signal of the D/A converter 12 is applied to the adder circuit 15 via a switch 16 which is on/off controlled in accordance with the Blanking pulse signal.

Figure 6:
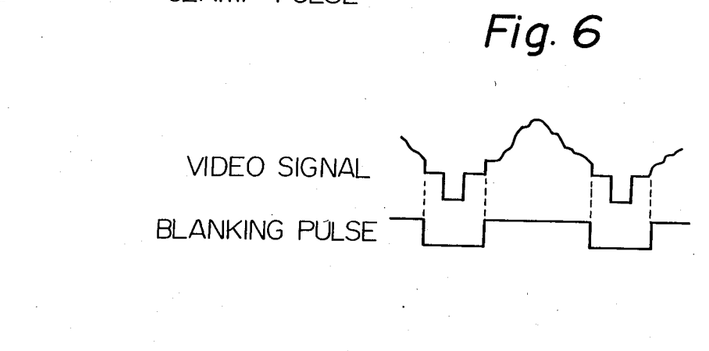
FIG. 6 is a waveform diagram showing the operation of the circuit shown in FIG. 5.

FIG. 6 illustrates the relationship between the video signal and the Blanking pulse signal. In the second embodiment shown in FIG. 5, the switch 16 is opened during a period when the Blanking pulse signal has a logical high level, so that the luminance level of the video signal is changed in accordance with the output signal of the D/A converter 12 for performing the phase compensating operation. It will be readily understood that this embodiment is characterized by varying the Set Up level of the playback video signal. However, the magnitude of the Set Up level fluctuation due to this operation can be negligible because the frequency of the carrier signal of the FM-RF signal is relatively high (8 MHz in the case of the video disc system) and the Set UP level fluctuation during playback operaiton is by far less than a level which is visually detectable.

Furthermore, even though the above explained embodiments are constructed in a manner that the remaining component $\phi_n$ of the cumulative value of the phase of the recording RF signal of each 1H period is corrected to 0 (zero) or $\pi$ every one rotation of the disc, it is possible to perform the correction every 1/M rotation of the disc (M being a natural number). Moreover, the amount of phase correction is not limited to 0 and $\pi$ and it can be set to values such as $\alpha$ or $\alpha \pm \pi$.

As an example, the remaining value of the phase of a first section of the recording track can be set to $\alpha \pm \pi/2$ ($\alpha$ being an invariable including 0) for one section of the recording track and then controlled to $\alpha \mp \pi/2$ for another section of the recording track adjacent to the above mentioned section of the recording track. In short, it is sufficient that there is a difference of between the remaining values $\phi_n$ of the phase of adjacent two recording tracks.

Furthermore, if the pieces of the picture information recorded in each recording tracks are almost the same with each other, the 1H delay circuit 5 used in the embodiment described in the above can be eliminated. In such a case, it is preferable to control the remaining value $\phi_n$ of the phase of each line in accordance with a value N corresponding to the remaining value of the phase which is obtained from the previous horizontal scanning line.

It will be understood from the foregoing that according to the present invention, the recording process itself is provided with a measure for reducing the crosstalk component, and therefore, the it is not necessary to provide any measure for reducing the crosstalk component to the playback system and the invention is very advantageous for reducing the size and the price of the video information playback system.

What is claimed is:

1. A video information recording method for producing a recordable video information signal, having an RF carrier, a composite video signal and a luminance signal component, on a recording medium having at least a recording track that includes a first section and a neighbouring second section, comprising steps of:

accumulating the instantaneous potential levels of the composite video signal within each 1H period that is proportional to a cumulative value of the phase of the recordable signal of 1H period;

providing a first and second predetermined value $\alpha$ ($\alpha$ being a constant value including 0) and $\alpha + \pi$ or $\alpha - \pi$, respectively;

controlling a level of the luminance signal component of said composite video signal by subtracting a value $2k\pi$ (k being an integer including 0) from the cumulative value of the phase of the recordable signal of 1H period so that a remaining phase value of each 1H period of the recordable signal is:

fixed to a first predetermined value $\alpha$ ($\alpha$ being a constant value including 0) for said first section of said recording track; and fixed to a second predetermined value $\alpha + \pi$ or $\alpha - \pi$ for said second section of said recording track neighbouring said first section of said recording track;

modulating the frequency the RF carrier signal by said composite video signal obtained by said controlling step, to produce the the recordable signal; and maintaining an absolute value of a difference between the cumulative value of the phase of the recordable signal of a 1H period, adapted to be recorded in said first section of the recording track, and the cumulative value of the phase of the recordable signal of a corresponding 1H period, adapted to be recorded in said second section of the recording track neighbouring said first section of the recording track, said absolute value being maintained at a value $(2m+1)\pi$ (m being a positive integer including 0).

2. A video information recording system for producing recordable video information signal, that includes an RF carrier and a composite video signal having a luminance signal component, for a recording medium having at least a recording track that includes a first section and a neighbouring second section, comprising:
  means for accumulating the instantaneous potential levels of the composite video signal within each 1H period that is proportional to a cumulative value of the phase of the recordable signal of 1H period;
  means for obtaining a remaining phase value of each 1H period of the recordable signal by subtracting a value $2k\pi$ (k being an integer including 0) from the cumulative value of the phase of the recordable signal of 1H period, said remaining phase value of each 1H period is fixed to a first predetermined value $\alpha$ ($\alpha$ being a constant value including 0) for the first section of said recording track and is fixed to a second predetermined value $\alpha+\pi$ or $\alpha-\pi$ for the second section of said recording track neighbouring said first section of recording track;
  means for controlling a level of the luminance signal component of said composite video signal in response to the remaining phase value;
  means for modulating in frequency the RF carrier signal by said composite video signal obtained by said controlling means and for producing the recordable signal; and
  thereby maintaining an absolute value of a difference between the cumulative value of the phase of the recordable signal of a 1H period adapted to be recorded in said first section of the recording track and the cumulative value of the phase of the recordable signal of a corresponding 1H period adapted to be recorded in said second section of the recording track neighbouring said first section of the recording track, said absolute value of said difference being maintained to a value $(2m+1)\pi$ (m being a positive integer including 0).

3. A recording medium on which video information is recorded comprising:
  a recording disc having spiral or concentrically shaped recording tracks thereon;
  said video information being recorded on said recording tracks of said recording disc; and,
  said video information recorded on one section of said recording tracks as compared with said video information recorded on another neighbouring section of said recording tracks having the following characteristic:
  the absolute value of the difference between the cumulative value of the phase of the video information signal in a 1H period recorded on said one section and the cumulative value of the phase of the video information signal in a corresponding 1H period recorded on said neighbouring section being maintained at a value $(2m+1)\pi$ (m being a positive integer including 0).

4. A recording medium as set forth in claim 3, wherein said video information includes luminance signal portions and horizontal sync pulse portions.

5. A recording medium as set forth in claim 3, wherein said video information is recorded on said recording disc in the form of an FM-RF signal.

6. A video information recording method for producing recordable video information signal, including an RF carrier and a composite video signal having a luminance signal component, a recording medium having at least a recording track that includes a first section and a neighbouring second section, comprising steps of:
  accumulating the instantaneous potential levels of the composite video signal within each 1H period which are proportional to a cumulative value of the phase of the recordable signal within each 1H period;
  providing a value $2k\pi$ (k being an integer including 0), a first predetermined value $\alpha$ ($\alpha$ being a constant value including 0) and a second predetermined value $\alpha+\pi$ or $\alpha-\pi$;
  obtaining a remaining phase value for each 1H period by subtracting the value $2k\pi$ (k being an integer including 0) from said cumulative value of the phase;
  detecting the presence of the first section and the second neighbouring section of said recording track;
  setting said remaining phase value to the first predetermined value $\alpha$ ($\alpha$ being a constant value including 0) dependent upon detection of said first section;
  setting said remaining phase value to the second predetermined value $\alpha+\pi$ or $\alpha-\pi$ dependent upon detection of said second neighbouring section;
  controlling a level of the luminance signal component of said composite video signal dependent upon the set remaining phase value;
  FM modulating the RF carrier signal with said composite video signal obtained by said controlling step, to produce the recordable signal; and
  wherein the steps of accumulating, setting and controlling result in maintaining the absolute value of the difference between the cumulative value of the phase of the recordable signal in a 1H period adapted to be recorded on said first section and the cumulative value of the phase of the recordable signal in a corresponding 1H period adapted to be recorded in said second neighbouring section to a value $(2m+2)\pi$ (m being a positive integer including 0).

7. A system for generating a recording signal consisting of a carrier signal modulated by a composite video signal having luminance signal and a sync tip level, to be recorded on a recording disc having first sections of recording tracks and second sections of recording tracks interleaved with each other, comprising:
  (a) sampling means for sampling said composite video signal at a predetermined sampling frequency and producing a plurality of sampled values;
  (b) accumulating means connected to said sampling means for accumulating said sampled values during each horizontal scanning period and generating a remaining value $\phi n$ corresponding to a difference between an accumulated value of said sampled values and a value corresponding to a multiple of a period $2\pi$ of frequency of said carrier signal;
  (c) disc revolution pulse signal generating means for generating a disc revolution pulse signal indicative of each revolution of said recording disc;
  (d) phase controlling means connected to said accumulating means for generating a first signal corresponding to said remaining value $\phi n$ generated by said accumulating means and a second signal corresponding to a $\pi/2$ shifted value of said remaining value $\phi$n alternatively in response to said disc revolution pulse signal;

(e) level controlling means connected to said phase controlling means, for shifting one of said sync tip level and a level of said luminance signal of said composite video signal in accordance with said first and second signals generated by said phase controlling means; and, (f) modulation means connected to said level controlling means for modulating said carrier signal by said composite video signal from said level controlling means, thereby maintaining a phase difference between said carrier signal for said first sections of recording tracks and said carrier signal for said second section of recording tracks, to a constant value of an odd multiple of $\pi$.

* * * * *